(12) United States Patent
Vasudevan

(10) Patent No.: US 8,153,706 B2
(45) Date of Patent: *Apr. 10, 2012

(54) POLYMERIC COLORANTS HAVING PIGMENT AND DYE COMPONENTS AND CORRESPONDING INK COMPOSITIONS

(75) Inventor: Sundar Vasudevan, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1289 days.

This patent is subject to a terminal disclaimer.

(21) Appl. No.: 11/239,738

(22) Filed: Sep. 29, 2005

(65) Prior Publication Data

US 2006/0089422 A1    Apr. 27, 2006

Related U.S. Application Data

(63) Continuation-in-part of application No. 11/058,006, filed on Feb. 14, 2005.

(60) Provisional application No. 60/622,276, filed on Oct. 25, 2004.

(51) Int. Cl.
| | |
|---|---|
| A61K 9/16 | (2006.01) |
| C08F 8/00 | (2006.01) |
| C08F 8/14 | (2006.01) |
| C08F 8/30 | (2006.01) |
| C08F 20/08 | (2006.01) |
| C08F 20/66 | (2006.01) |
| C08F 22/04 | (2006.01) |
| C08F 120/08 | (2006.01) |
| C08F 120/66 | (2006.01) |
| C08F 122/04 | (2006.01) |
| C08F 220/08 | (2006.01) |
| C08F 220/06 | (2006.01) |
| C08F 220/66 | (2006.01) |
| C08F 222/04 | (2006.01) |
| C08F 297/02 | (2006.01) |
| C08J 3/00 | (2006.01) |
| C08K 3/20 | (2006.01) |
| C08L 25/00 | (2006.01) |
| C08L 31/00 | (2006.01) |
| C08L 33/00 | (2006.01) |
| C08L 33/06 | (2006.01) |
| C09B 67/00 | (2006.01) |
| C09D 5/00 | (2006.01) |
| C09D 5/02 | (2006.01) |
| C09D 11/00 | (2006.01) |

(52) U.S. Cl. .................. 523/160; 525/326.1; 525/327.4; 525/327.6; 525/327.7

(58) Field of Classification Search .............. 525/326.1, 525/327.4, 327.6, 327.7; 523/160, 161; 524/543, 524/556, 559, 560, 577
See application file for complete search history.

(56) References Cited

U.S. PATENT DOCUMENTS

| | | | |
|---|---|---|---|
| 3,337,288 A | 8/1967 | Shojiro et al. | |
| 3,904,562 A | 9/1975 | Hopfenberg et al. | |
| 4,492,686 A | 1/1985 | Guillon et al. | |
| 4,608,401 A | 8/1986 | Martin | |
| 4,664,714 A | 5/1987 | Katsura et al. | |
| 4,680,332 A | 7/1987 | Hair et al. | |
| 4,758,639 A | 7/1988 | Koyanagi et al. | |
| 4,877,451 A | 10/1989 | Winnik et al. | |
| 4,880,432 A | 11/1989 | Egan et al. | |
| 5,023,159 A | 6/1991 | Ong et al. | |
| 5,053,441 A | 10/1991 | Biale | |
| 5,073,171 A | 12/1991 | Eaton | |
| 5,139,915 A | 8/1992 | Moffat et al. | |
| 5,145,518 A | 9/1992 | Winnik et al. | |
| 5,250,107 A | 10/1993 | Bares | |
| 5,304,244 A | 4/1994 | Goldmann et al. | |
| 5,543,219 A | 8/1996 | Elwakil | |
| 5,554,739 A | 9/1996 | Belmont | |
| 5,707,432 A | 1/1998 | Adams et al. | |
| 5,786,410 A | 7/1998 | Foucher et al. | |
| 5,851,274 A | 12/1998 | Lin | |
| 5,851,280 A | 12/1998 | Belmont et al. | |
| 5,852,073 A | 12/1998 | Villiger et al. | |
| 5,958,121 A | 9/1999 | Lin | |
| 5,969,005 A | 10/1999 | Yamashita et al. | |
| 5,969,033 A * | 10/1999 | Pearlstine | 524/502 |
| 6,103,066 A | 8/2000 | DiPietro | |
| 6,309,452 B1 | 10/2001 | Beach et al. | |
| 6,538,047 B1 | 3/2003 | Miyabayashi | |
| 6,616,946 B1 | 9/2003 | Meier et al. | |
| 6,712,894 B2 | 3/2004 | Shepard | |
| 6,790,878 B2 | 9/2004 | Kurabayashi | |
| 6,811,598 B1 | 11/2004 | Micale | |
| 6,835,393 B2 | 12/2004 | Hoffman et al. | |
| 6,841,591 B2 | 1/2005 | Vincent et al. | |
| 6,894,105 B2 | 5/2005 | Parent et al. | |

(Continued)

FOREIGN PATENT DOCUMENTS

| | | | |
|---|---|---|---|
| JP | 03-199494 | | 8/1991 |
| JP | 09-279073 | * | 10/1997 |
| JP | 10-60298 | * | 3/1998 |
| JP | 11-293164 | * | 10/1999 |
| JP | 01-040235 | | 2/2001 |

(Continued)

OTHER PUBLICATIONS

Machine translation of JP 09-279073.*
S. Vasudevan, Reply Brief filed Aug. 10, 2010, U.S. Appl. No. 11/058,006, filed Feb. 14, 2005.
S. Vasudevan, Examiner's Answer dated Jun. 10, 2010, U.S. Appl. No. 11/058,006, filed Feb. 14, 2005.

(Continued)

Primary Examiner — Patrick Niland

(57) ABSTRACT a polymeric colorant includes a pigment having a polymer covalently attached thereto, a dye covalently attached to the polymer, and a dispersant covalently attached to at least one of the pigment, the polymer, and the dye, wherein the dye covalently attached to the polymer includes a reactant coupled to the dye and to the polymer.

34 Claims, No Drawings

U.S. PATENT DOCUMENTS

| | | | |
|---|---|---|---|
| 7,008,977 B2 | 3/2006 | Sakai et al. | |
| 7,018,953 B2 | 3/2006 | Gore et al. | |
| 7,086,732 B2 | 8/2006 | Kasperchik et al. | |
| 7,119,133 B2 | 10/2006 | Vincent et al. | |
| 7,184,199 B2 | 2/2007 | Van Brocklin et al. | |
| 2003/0144376 A1 | 7/2003 | Vincent et al. | |
| 2003/0195291 A1* | 10/2003 | Lamprey et al. | 524/495 |
| 2003/0205171 A1 | 11/2003 | Adams et al. | |
| 2003/0213410 A1 | 11/2003 | Adams et al. | |
| 2003/0217672 A1 | 11/2003 | Palumbo | |
| 2004/0007152 A1 | 1/2004 | Palumbo | |
| 2004/0024100 A1 | 2/2004 | Parent et al. | |
| 2005/0228071 A1 | 10/2005 | Vasudevan | |
| 2006/0089421 A1 | 4/2006 | Vasudevan | |
| 2006/0094796 A1 | 5/2006 | Vasudevan | |
| 2006/0207473 A1 | 9/2006 | Vasudevan | |

FOREIGN PATENT DOCUMENTS

| | | | |
|---|---|---|---|
| JP | 2003-519709 | * | 6/2003 |
| JP | 4686332 | | 2/2011 |
| WO | WO 98/42799 A | | 10/1998 |
| WO | WO 01/25340 A | | 4/2001 |
| WO | WO 0151566 | | 7/2001 |
| WO | WO-03/095565 A1 | * | 11/2003 |
| WO | WO-03/095568 A1 | * | 11/2003 |
| WO | WO 2005/095531 A | | 10/2005 |
| WO | WO 2006/024099 A | | 3/2006 |
| WO | WO 2007/006636 A2 | | 1/2007 |
| WO | WO 2007/006682 A1 | | 1/2007 |

OTHER PUBLICATIONS

S. Vasudevan, Appeal Brief filed Mar. 18, 2010, U.S. Appl. No. 11/058,006, filed Feb. 14, 2005.
S. Vasudevan, Final Office Action dated Dec. 22, 2009, U.S. Appl. No. 11/058,006, filed Feb. 14, 2005.
S. Vasudevan, Response to Office Action dated Jun. 10, 2009, U.S. Appl. No. 11/058,006, filed Feb. 14, 2005.
S. Vasudevan, Office Action dated Jun. 10, 2009, U.S. Appl. No. 11/058,006, filed Feb. 14, 2005.
S. Vasudevan, Request for Continued Examination and Response to Final Office Action dated Dec. 1, 2008, U.S. Appl. No. 11/058,006, filed Feb. 14, 2005.
S. Vasudevan, Advisory Action dated Feb. 23, 2009, U.S. Appl. No. 11/058,006, filed Feb. 14, 2005.
S. Vasudevan, Response to Final Office Action dated Dec. 1, 2008, U.S. Appl. No. 11/058,006, filed Feb. 14, 2005.
S. Vasudevan, Final Office Action dated Dec. 1, 2008, U.S. Appl. No. 11/058,006, filed Feb. 14, 2005.
S. Vasudevan, Response to Office Action dated May 15, 2008, U.S. Appl. No. 11/058,006, filed Feb. 14, 2005.
S. Vasudevan, Office Action dated May 15, 2008, U.S. Appl. No. 11/058,006, filed Feb. 14, 2005.
S. Vasudevan, Response to Restriction Requirement dated Jan. 11, 2008, U.S. Appl. No. 11/058,006, filed Feb. 14, 2005.
S. Vasudevan, Restriction Requirement dated Jan. 11, 2008, U.S. Appl. No. 11/058,006, filed Feb. 14, 2005.
S. Vasudevan, Notice of Allowance dated Sep. 20, 2010, U.S. Appl. No. 11/829,593, filed Jul. 27, 2007.
S. Vasudevan, RCE and Information Disclosure Statement filed Aug. 13, 2010, U.S. Appl. No. 11/829,593, filed Jul. 27, 2007.
S. Vasudevan, Notice of Allowance dated May 26, 2010, U.S. Appl. No. 11/829,593, filed Jul. 27, 2007.
S. Vasudevan, Appeal Brief filed Mar. 5, 2010, U.S. Appl. No. 11/829,593, filed Jul. 27, 2007.
S. Vasudevan, Final Office Action dated Dec. 1, 2009, U.S. Appl. No. 11/829,593, filed Jul. 27, 2007.
S. Vasudevan, Response to Office Action dated May 11, 2009, filed Aug. 10, 2009, U.S. Appl. No. 11/829,593, filed Jul. 27, 2007.
S. Vasudevan, Office Action dated May 11, 2009, U.S. Appl. No. 11/829,593, filed Jul. 27, 2007.
S. Vasudevan, RCE and Response to Final Office Action dated Nov. 25, 2008, filed Feb. 25, 2009, U.S. Appl. No. 11/829,593, filed Jul. 27, 2007.
S. Vasudevan, Final Office Action dated Nov. 25, 2008, U.S. Appl. No. 11/829,593, filed Jul. 27, 2007.
S. Vasudevan, Response to Office Action dated May 14, 2008, filed Aug. 13, 2008, U.S. Appl. No. 11/829,593, filed Jul. 27, 2007.
S. Vasudevan, Office Action dated May 14, 2008, U.S. Appl. No. 11/829,593, filed Jul. 27, 2007.
Hewlett-Packard Development Company, LP., Office Action dated May 31, 2011; Japanese Patent App. No. 2005-309466, 3 p. This action is not translated.
Hewlett-Packard Development Company, L.P., Office Action dated May 31, 2011; Japanese Patent App. No. 2005-309466, 1 p.
Madras et al. "Polymeric Dye Inkjet Colorants with High Waterfastness" Society for Imaging Science and Technology Eastman Kodak, pp. 355-358 , 2008.
Furuya et al., Japanese Office Action dated Dec. 22, 2009, Japanese App. No. 2005-309,466, 7 p.

* cited by examiner

POLYMERIC COLORANTS HAVING PIGMENT AND DYE COMPONENTS AND CORRESPONDING INK COMPOSITIONS

RELATED APPLICATIONS

The present application is a continuation-in-part of application Ser. No. 11/058,006, filed on Feb. 14, 2005, which application claims the benefit of U.S. Provisional Patent Application No. 60/622,276, filed on Oct. 25, 2004, which applications are incorporated by reference herein in their entirety.

BACKGROUND

Colorants are widely used in many applications to provide useful and aesthetic appearance to articles and printed images. Standard colorants can most often be classified as either pigments or dyes. Although such colorants can be directly mixed into an article of manufacture, it is often desirable to prepare ink compositions containing colorants for printing of color images. Such ink compositions typically include a liquid vehicle such as an appropriate solvent containing the dye or the pigment. Dye-based inks generally use a colorant that is soluble in the given liquid vehicle. Conversely, pigmented inks typically use an insoluble dispersed solid colorant to achieve color.

Dye and pigment colorants each have certain properties which are beneficial in certain circumstances and can provide predetermined color properties to a printed image. However, each of dye and pigment colorants also have various limitations and drawbacks which present unique challenges. Specifically, dye colorants exhibit good chroma and long-term stability in solution. However, dye colorants also tend to have poor waterfastness, lightfastness, and smear resistance. In contrast, pigment colorants typically have good waterfastness, good lightfastness, and good smear resistance. Unfortunately, pigment colorants also tend to have limited chroma and a myriad of issues related to maintaining the pigment particles dispersed in solution. Thus, pigment particles of pigment inks can often settle over time.

Consequently, the choice of dye and pigment colorants for use in any particular application is often constrained to these limitations and a wide variety of chemical and physical mechanisms are used to minimize these constraints in a particular commercial product. Accordingly, investigations continue into developing better colorants and ink formulations.

SUMMARY

In one aspect of the present system and method, a polymeric colorant includes a pigment having a polymer covalently attached thereto, a dye covalently attached to the polymer, and a dispersant covalently attached to at least one of the pigment, the polymer, and the dye, wherein the dye covalently attached to the polymer includes a reactant coupled to the dye and to the polymer.

In another embodiment, an inkjet composition includes a polymeric colorant with a pigment having a polymer covalently attached thereto, a dye covalently attached to the polymer, and a dispersant covalently attached to at least one of the pigment, the polymer, and the dye, wherein the dye covalently attached to the polymer includes a reactant coupled to the dye and to the polymer.

DETAILED DESCRIPTION

Before particular embodiments of the present system and method are disclosed and described, it is to be understood that the present system and method are not limited to the particular process and materials disclosed herein as such may vary to some degree. It is also to be understood that the terminology used herein is used for the purpose of describing particular embodiments only and is not intended to be limiting, as the scope of the present system and method will be defined only by the appended claims and equivalents thereof.

In describing and claiming the present exemplary system and method, the following terminology will be used.

The singular forms "a," "an," and "the" include plural referents unless the context clearly dictates otherwise. Thus, for example, reference to "a dye" includes reference to one or more of such materials.

As used in the present specification and in the appended claims, the term "liquid vehicle" is defined to include liquid compositions that can be used to carry colorants, including pigments, to a substrate. Liquid vehicles are well known in the art, and a wide variety of liquid vehicle components may be used in accordance with embodiments of the present exemplary system and method. Such liquid vehicles may include a mixture of a variety of different agents, including without limitation, surfactants, solvents, co-solvents, buffers, biocides, viscosity modifiers, sequestering agents, stabilizing agents, and water. Though not liquid per se, the liquid vehicle can also carry other solids, such as polymers, UV curable materials, plasticizers, cosolvents, salts, etc.

As used herein, "pigment" refers to a colorant particle which is substantially insoluble in the liquid vehicle in which it is used.

As used herein, "dye" refers to a colorant compound which is substantially soluble in the liquid vehicle in which it is used.

As used herein, "functionalized" refers to pigment particles which have a compound chemically attached via covalent bonds. This is in contrast to pigment particles which have compounds attached via ionic bonds or other weaker intermolecular forces.

As used herein, "bleed" refers to the tendency of ink to run into and mix with adjacently printed inks. Bleed typically occurs prior to adjacently printed inks fully drying on a substrate. The degree of bleed will depend on a variety of factors such as the drying speed of the ink, ink chemistry, i.e. the presence of reactive or non-reactive bleed control mechanisms, and type of substrate, among other variables.

As used herein, "waterfastness" refers to an ink's exhibited degree of water resistance after printing on a substrate. Typically, this property is measured after the ink has dried, and measures the tendency of the ink to smear or otherwise change location in the presence of moisture.

As used herein, "chroma" refers to the attribute of color used to indicate the degree of departure of the color from gray of the same lightness as defined by ASTM (ASTM E 284). It is also used to refer to degree of saturation of color which is the ratio of chroma over lightness ($C^*/L^*$). Typically, dye colorants have a greater degree of saturation over pigment colorants having the same, or substantially the same, hue.

As used herein, "neutral gray" refers to a shade of gray which exhibits a substantial color constancy, i.e. substantially no change in color appearance when viewed under different light sources such as fluorescent and sunlight. Further, non-neutral gray colors also tend to have a subtle red or brown shade or appearance.

As used herein, the term "reactive" when referring to ink sets refers to a chemical reaction between two or more ink-jet inks. Such reactive ink sets can interact either by salt mechanisms, pH differential mechanisms, polymerization mechanisms, or other reactive mechanisms known to those skilled in the art.

As used herein, "self-dispersed pigment" refers to pigments that have been functionalized with dispersing agent, such as by chemical attachment or attraction of the dispersing agent to the surface of the pigment. The dispersing agent can be a small molecule or a polymer.

As used herein, "polymer-dispersed pigment" refers to a type of self-dispersed pigment wherein the pigment is attached to or is at least partially encapsulated by a polymer. The polymer can be covalently attached to the pigment surface, either directly or via an intermediate attachment group, or can be attached through non-covalent intermolecular attractive forces.

As used herein with respect to an identified property or circumstance, "substantially the same" allows for a degree of deviation that is sufficiently small so as to not measurably detract from the identified property or circumstance. The exact degree of deviation allowable may in some cases depend on the specific context. Thus, for example, a colorant which has a color "substantially" that of another colorant may deviate in color, i.e. hue, or other relevant property within a range which is imperceptible or nearly imperceptible upon visual inspection. Of course, other properties can vary considerably. For example, a black pigment can have substantially the same color and hue as a black dye; however, chroma, optical density, gloss, solubility, and the like can differ dramatically from one another. Conversely, identification of a property which is "substantially different" indicates a visible and/or measurable degree of difference.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight range of approximately 1 wt % to about 20 wt % should be interpreted to include not only the explicitly recited concentration limits of 1 wt % to about 20 wt %, but also to include individual concentrations such as 2 wt %, 3 wt %, 4 wt %, and sub-ranges such as 5 wt % to 15 wt %, 10 wt % to 20 wt %, etc.

In the following description, for purposes of explanation, numerous specific details are set forth in order to provide a thorough understanding of the present system and method for producing a polymeric colorant including a pigment and having a polymer covalently attached thereto. It will be apparent, however, to one skilled in the art, that the present method may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

In accordance with the present system and method, a polymeric colorant can include a pigment having a polymer covalently attached thereto. Further, a dye can be covalently attached to the polymer through esterification or by derivitizing the dye with a polymerizable group. A dispersant can be covalently attached to at least one of the pigment, the polymer, and/or the dye to provide dispersion stability to the polymeric colorant in a liquid vehicle. By including both a pigment and a dye component, the polymeric colorant can benefit from the properties of each. The dye and pigment components can be substantially the same color, or can be of different colors, depending on the desired appearance. The polymeric colorants of the present exemplary system and method are well suited to inclusion in ink-jet compositions, although many other applications are considered suitable for the instant polymeric colorants.

Alternatively, an ink-jet ink composition can include a liquid vehicle, a polymer attached dye, and a pigment. The polymer attached dye can include a dye covalently attached to a polymer, with the dye having a first color. Further, the pigment can have a second color which is substantially different in hue from the first color. In this alternative aspect, the pigment can be self-dispersed, polymer-dispersed, or covalently attached to the polymer.

Polymeric Colorants

The polymeric colorants of the present exemplary system and method can include a wide variety of polymers which can be covalently attached to dyes and/or pigments in accordance with the principles described herein. Polymers containing a reactive group such as anhydrides, carboxylic acids, sulfonic acids, vinyl sulfones, amines, alcohols, thiols, or the like are exemplary of suitable polymers. Non-limiting examples of specific polymers which can be used include maleic anhydride copolymers, acrylic copolymers, methacrylic copolymers, amine or alcohol-containing copolymers, and combinations thereof. In one aspect, the polymer can include an anhydride group configured for reaction with the reactive group of the dye. In another aspect, the polymer can include a carboxylic acid group which can serve as a point of attachment for the dye and optional additional groups, e.g., linking groups, lightfastness enhancing groups, dispersants, and the like. Further details of exemplary polymers will be provided below.

In one exemplary aspect, suitable polymers can include, but are in no way limited to, styrene-maleic anhydride copolymer, methyl vinyl ether-maleic anhydride copolymer, vinyl pyrrolidone-maleic anhydride copolymer, styrene acrylic acid copolymer, styrene methacrylic acid copolymer, 4-vinylaniline-acrylic acid copolymer, 4-vinylaniline-methacrylic acid copolymer, and combinations thereof.

In one aspect of the present exemplary system and method, the polymer can be a maleic anhydride copolymer such as, but in no way limited to, styrene-maleic anhydride copolymer (SMA) or methyl vinyl ether-maleic anhydride copolymer. Other specific polymers can include styrene-acrylics, polyethylene imine/phthalic anhydrides, polyethylene imine/phenylsuccinic anhydrides, polyethylene imine/succinic anhydrides, pentaethylene hexamines, polyethylene imines, polyurethanes, polyureas, acrylic polymers, vinyl polymers, polypyrrolidones, epoxies, polyesters, polysaccharides, polypeptides, celluloses, polyquats, polyamines, and copolymers thereof. Further, polymers capable of dispersing pigments at near neutral pH such as those containing sulfonic acids, fluoric acids, and α- and/or β-fluorocarboxylic acids. Several specific examples of such polymers can include styrene-vinylsulfonic acid copolymers, styrene-butyl acrylate-methacrylic acid-vinylsulfonic acid copolymers, styrene-trifluoroacrylic acid-vinylsulfonic acid copolymers, styrene-α-(trifluoromethyl)acrylic acid-vinylsulfonic acid copolymers, styrene-trifluoro acrylic acid copolymers, and the like.

Dye Attachment

The polymeric colorants of the present exemplary system and method can include a dye which is covalently attached to the polymer. In one aspect, the dye can be covalently attached to the polymer prior to, after, or simultaneous with attachment to the pigment. Suitable dyes can have an active group which can be reacted to form bonds with a particular polymer to form a polymer-dye colorant. A number of dyes can be suitable for this purpose. Particularly, dyes having active groups such as hydroxy, amine, carboxylic acid, sulfonic acid, thiol, alkyl halide, halotriazine, maleimide and vinyl sulfone, and combinations thereof can readily form covalent bonds with suitable polymers. Alternatively, dyes having active groups such as carboxyl, sulfonyl, or the like can be reacted with polymers having amine or alcohol groups. Thus, the reactive and active groups mentioned above can be present in either the dye or the polymer, depending on a specific embodiment. The dyes and the polymers can also include other functional groups that can be readily converted to any of the above mentioned groups so that they may be coupled after such conversion. Those skilled in the art will recognize various coupling reactions and associated reactive groups that may be used to couple a wide variety of dyes and polymers.

In one specific aspect, dyes having aliphatic amine active groups can be readily attached to polymers having anhydride, carboxyl, sulfonyl, and similar groups. Non-limiting examples of suitable dyes can include food dyes, FD&C dyes, acid dyes, direct dyes, reactive dyes, phthalocyanine dyes, derivatives of phthalocyanine sulfonic acids, and combinations thereof. Several specific examples of suitable dyes can include, but are in no way limited to, C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, C.I. Reactive Black 39, and combinations thereof.

Further, dyes having active groups such as alcohols and aromatic amines tend to not be very nucleophilic. Therefore, attachment of the dye to the polymer can be enhanced by addition of a nucleophilic catalyst such as, but not limited to, dimethylaminopyridine, N-methylimidazole, and the like. Additionally, reactive dyes such as those having vinyl sulfone groups can be attached via a dye linking group such as a thiol, e.g., using Michael addition chemistry as known to those skilled in the art. For example, 2-aminoethanethiol can be reacted with a polymer having an anhydride or other reactive group. The thiol group can then be reacted with a reactive dye in presence of sodium hydroxide to form a polymer attached dye colorant.

According to one exemplary embodiment, the dye may be coupled to the polymer via esterification of a polymer having a carboxyl group with a reactive dye molecule. More specifically, as illustrated with reference to Reaction 1 below, polymers that include carboxyl groups and are used for dispersing pigments include, but are in no way limited to, styrene acrylic acid copolymers such as Joncryl® acrylic polymers and their analogs. As illustrated, the dye may be coupled to a reactant having an alcohol reaction site such as, but in no way limited to, ethylenediamine. According to the exemplary reaction of Reaction 1, the dye is covalently bonded to the styrene acrylic acid copolymer having a carboxyl group via esterification of the carboxylic acid of the polymer with an alcohol via a condensation reaction.

Reaction 1

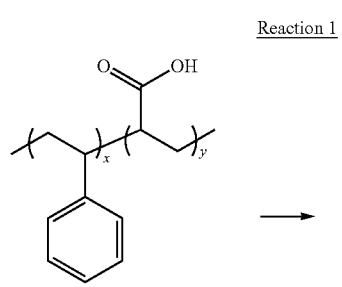

An alternative of the above-mentioned conjugation is illustrated in Reaction 2 below. As shown, SMA, aminoethanethiol (AET), and a dye derivative such as LRSC react to form the resultant conjugate. As illustrated, the one step modification of the dye derivative couples a dye derivative onto a first reactive site of the SMA, and an aminoethanethiol (AET) is coupled to a second reactive site.

Reaction 2

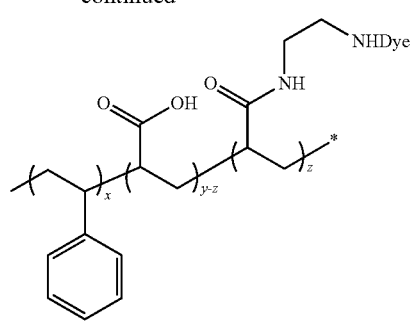

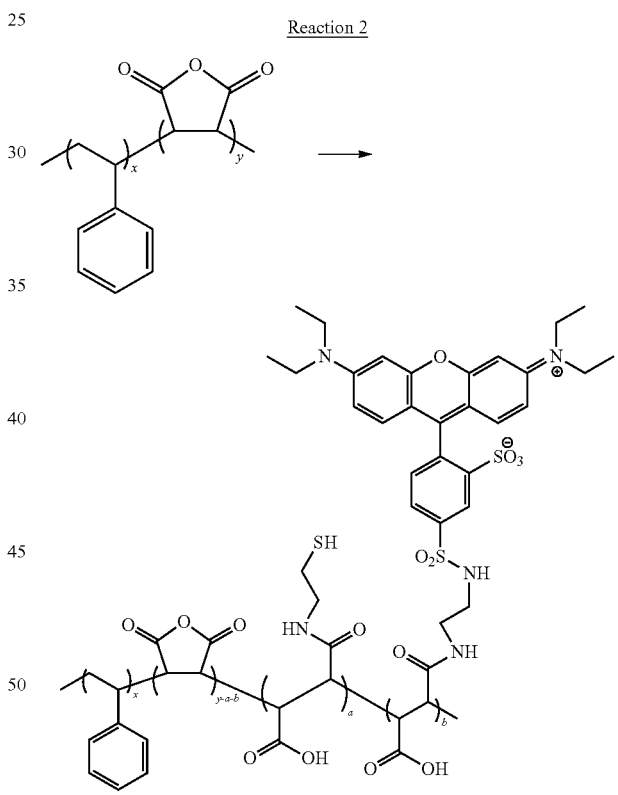

In yet another alternative embodiment of the present exemplary system and method, a dye can be attached to a monomer which can be subsequently copolymerized to form a polymer in accordance with the present system and method. The polymers disclosed above can be suitable for such an embodiment. For example, methacrylate functionalized dyes can be copolymerized with monomers such as styrene, maleic anhydride, acrylic acid, methacrylic acid, or the like. Examples of such methacrylate functionalized dyes are described in more detail in U.S. Patent Application Publication 2004/0024100, which is incorporated herein by reference.

The extent of attachment of dye molecules to each polymer chain can vary depending on reaction conditions, the polymer, and the dye. However, as a general guideline, the dye to polymer chain ratio can range from about 0.05 mmol/g to 10 mmol/g, and often from about 1 mmol/g to about 5 mmol/g, i.e. mmol of dye molecules per gram of polymer. Thus, the number of dye molecules per pigment particle can range from about 10 μmmole dye molecules per gram of pigment to about 100 mmole per gram of pigment, and in some cases from about 0.05 mmole dye per gram of pigment to about 2 mmole per gram pigment.

According to one exemplary embodiment, the attachment of dye molecules to a monomer may be performed by a one step modification of a dye derivative. According to this exemplary embodiment, the desired dye is derivatized with a polymerizable group such that the resultant monomer may be copolymerized with other suitable monomers. The derivatization of a desired dye with a polymerizable group is illustrated below with reference to Reactions 3 and 4. As illustrated in Reaction 3 below, a dye derivative, such as lissamine rhodamine sulfonyl chloride also known as xanthylium, 9-[4-(Chlorosulfonyl)-2-sulfophenyl]-3,6-bis(diethylamino)-, inner salt (9Cl) or (LRSC) which is a dye derivative of Acid Red 52, is combined with an adduct. According to the exemplary embodiment illustrated in Reaction 3 the adduct may be, but is in no way limited to, an ethylenediamine adduct.

Reaction 3

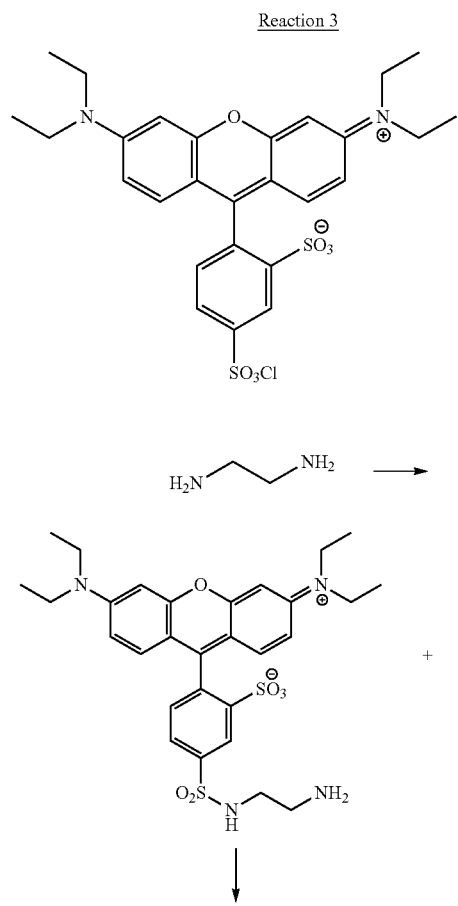

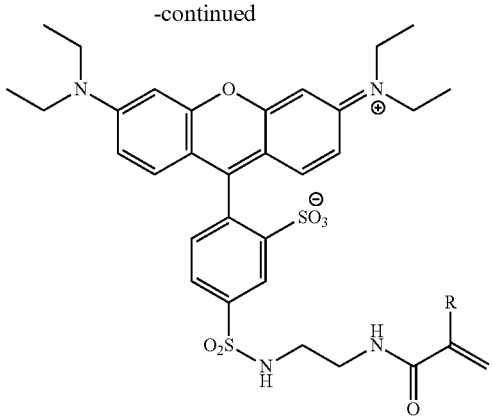

Similarly, in Reaction 4, the LRSC is combined with 2-aminoethyl methacrylate to form another reactive monomer that may be used to couple and disperse pigment.

Reaction 4

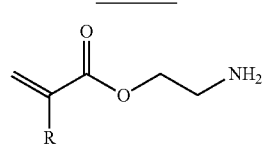

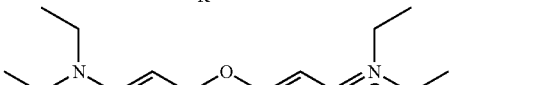

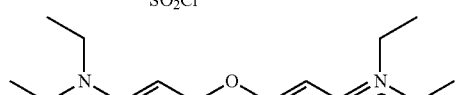

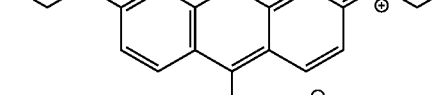

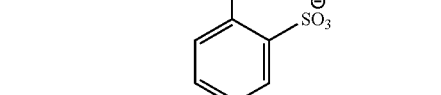

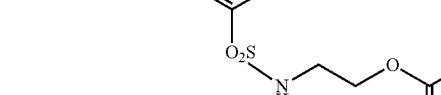

Once the above-mentioned monomers are formed, by reaction between the dye derivative and adduct, they may be copolymerized with other vinyl containing monomers including, but in no way limited to, those illustrated in Formulas 1 through 3 below, or styrene, acrylic acid, methacrylic acid, benzyl acrylate, butyl acrylate, and the like. In the exemplary Formulas illustrated below, R can be either H or a methyl group.

Formula 1

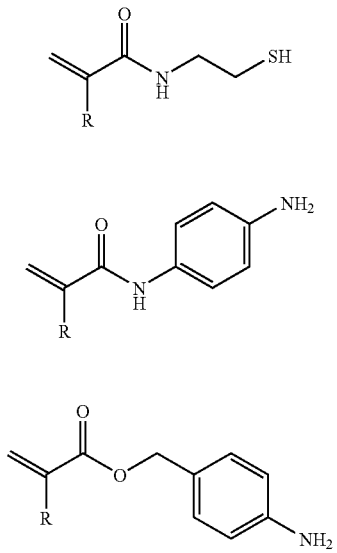

Formula 2

Formula 3

Once copolymerized, the resulting co-polymer may then be used to couple and disperse pigments, as described in detail below. According to one exemplary embodiment, providing for a colorant monomer to be copolymerized with other suitable monomers, allows for the preparation of a polymeric dye that includes both cyan and magenta chromophores. Consequently, each of the colorant monomers of the resulting polymer may include either a cyan or a magenta chromophore, with the remaining chromophore being included in the other colorant monomer. The ability to create a polymeric dye that includes a plurality of dye chromophores allows for the formation of a natural black ink. More specifically, such a polymeric dye can be used as a dispersant or a binder along with a photo black ink to get a neutral black ink.

Additionally, dye attaching monomers can be prepared to synthesize other classes of polymers. For example, Reaction 5 below illustrates the synthesis of a monomer suitable for preparing polyurethanes, according to the present exemplary system and method.

Reaction 5

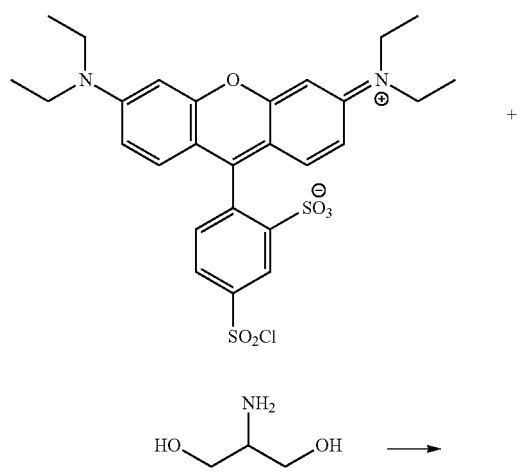

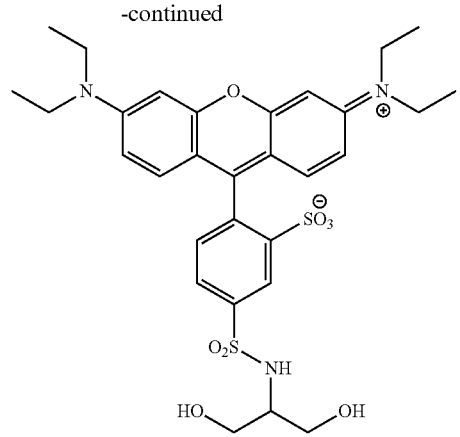

-continued

As illustrated in Reaction 5 above, the monomer may be copolymerized with di-isocyanates and other diols containing carboxylic acid groups to generate polyurethanes that can be used to disperse pigments. In addition to being used as dispersants, the polymeric dyes may also be used as binders in the ink to improve the chroma even further without loss of water fastness.

As mentioned previously, the polymer can include more than one type of dye covalently attached thereto. Attachment of additional dyes can be performed simultaneously with attachment of a first dye, or can be attached in subsequent steps. Further, the additional dyes can be substantially the same color as the first dye. Such additional dyes can be used to affect any number of properties such as dispersion stability, pH, lightfastness, cost, and/or the like. Optionally, the additional dye(s) can have a substantially different color than the first dye. For example, a hue angle difference of 75 degrees or more would clearly indicate a substantially different color. As a guideline, hue angle differences are roughly 90 degrees from red to yellow, yellow to green, and green to blue.

Pigment Attachment

Many commonly known pigments can be covalently attached using the polymers and methods of the present exemplary system. Specifically, various pigments can be functionalized with a suitable chemical moiety which can be directly attached to the polymer or attached to the polymer through a linking group. Such methods of functionalizing pigments are known to those skilled in the art. For example, U.S. Pat. Nos. 5,554,739; 5,707,432; and 5,851,280, and U.S. Patent Application Nos. 2003/0195291, 2003/0213410, 2003/0217672, and 2004/0007152 disclose methods of functionalizing pigments using a number of methods, each of which is hereby incorporated by reference in their entirety.

As mentioned previously, linking groups and/or functional groups attach pigments to the polymeric colorants, according to one exemplary embodiment. Non-limiting examples of common linking groups and functional groups attached to pigments can include 2-(4-aminophenyl) sulfonylethane sulfonate, diazonium salt reaction products, 4-aminobenzylamine, 4-aminophenylalanine, and other nucleophilic groups. Optionally, certain polymers can be directly attached to a functionalized pigment. For example, polymers including an aminophenyl group could be directly attached to pigments after diazotization. An example of such a polymer would be a styrene acrylate polymer where some of the styrene monomers are replaced by 4-aminostyrene, i.e. 4-vinylaniline. Frequently, it can also be desirable to introduce a linking active group to the polymer to facilitate attachment of the linking group thereto. For example, the polymer can be reacted with 2-aminoethanethiol to form a thiol group which can then be used to attach to the pigment functionalized with 2-(4-aminophenyl) sulfonylethane sulfonate. Other linking active groups can include, but is in no way limited to, anhydrides, amines, or the like.

Although the exact ratio can vary somewhat, typically, the pigment particle to polymer chain weight ratio can be from about 10:1 to 1:10. In addition, attachment of the dye to the polymer, rather than directly to the pigment, allows for increased availability of pigment surface area for polymeric dispersant (either covalently attached or encapsulating), polymer-dye colorant of the present system, and/or other useful additives. Thus, the amount of dye can be increased without decreasing the ability to provide dispersant for stability of the pigment particles.

Suitable pigments can be black pigments, white pigments, cyan pigments, magenta pigments, yellow pigments, or the like. Further, pigments can be organic or inorganic particles as is well known in the art. Suitable inorganic pigments include, for example, carbon black. However, other inorganic pigments may be suitable such as titanium oxide, cobalt blue ($CoO-Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens, perylene pigments, perynone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitropigments, nitroso pigments, and the like. Representative examples of phthalocyanine blues include copper phthalocyanine blue and derivatives thereof (Pigment Blue 15). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19 and Pigment Violet 42. Representative examples of anthraquinones include Pigment Red 43, Pigment Red 194 (Perinone Red), Pigment Red 216 (Brominated Pyranthrone Red) and Pigment Red 226 (Pyranthrone Red). Representative examples of perylenes include Pigment Red 123 (Vermillion), Pigment Red 149 (Scarlet), Pigment Red 179 (Maroon), Pigment Red 190 (Red), Pigment Violet 19, Pigment Red 189 (Yellow Shade Red) and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 151, Pigment Yellow 117, Pigment Yellow 128 and Pigment Yellow 138. Such pigments are commercially available in either powder or press cake form from a number of sources including, BASF Corporation, Engelhard Corporation and Sun Chemical Corporation.

Examples of black pigments that can be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 7000, RAVEN 5750, RAVEN 5250, RAVEN 5000, and RAVEN 3500; Degussa pigments such as Color Black FW 200, RAVEN FW 2, RAVEN FW 2V, RAVEN FW 1, RAVEN FW 18, RAVEN S160, RAVEN FW S170, Special Black 6, Special Black 5, Special Black 4A, Special Black 4, PRINTEX U, PRINTEX 140U, PRINTEX V, and PRINTEX 140V; and TIPURE R-101 available from Dupont. The above list of pigments includes unmodified pigment particulates, small molecule attached pigment particulates, and polymer-dispersed pigment particulates.

Similarly, a wide variety of colored pigments can be used with the present system and method, therefore the following listing is not intended to be limiting. For example, colored pigments can be blue, brown, cyan, green, white, violet, magenta, red, orange, yellow, as well as mixtures thereof. The following color pigments are available from Cabot Corp.: CABO-JET 250C, CABO-JET 260M, and CABO-JET 270Y. The following color pigments are available from BASF Corp.: PALIOGEN Orange, PALIOGEN Orange 3040, PALIOGEN Blue L 6470, PALIOGEN Violet 5100, PALIOGEN Violet 5890, PALIOGEN Yellow 1520, PALIOGEN Yellow 1560, PALIOGEN Red 3871K, PALIOGEN Red 3340, HELIOGEN Blue L 6901F, HELIOGEN Blue NBD 7010, HELIOGEN Blue K 7090, HELIOGEN Blue L 7101F, HELIOGEN Blue L6900, L7020, HELIOGEN Blue D6840, HELIOGEN Blue D7080, HELIOGEN Green L8730, HELIOGEN Green K 8683, and HELIOGEN Green L 9140. The following pigments are available from Ciba-Geigy Corp.: CHROMOPHTAL Yellow 3G, CHROMOPHTAL Yellow GR, CHROMOPHTAL Yellow 8G, IGRAZIN Yellow 5GT, IGRALITE Rubine 4BL, IGRALITE Blue BCA, MONASTRAL Magenta, MONASTRAL Scarlet, MONASTRAL Violet R, MONASTRAL Red B, and MONASTRAL Violet Maroon B. The following pigments are available from Heubach Group: DALAMAR Yellow YT-858-D and HEUCOPHTHAL Blue G XBT-583D. The following pigments are available from Hoechst Specialty Chemicals: Permanent Yellow GR, Permanent Yellow G, Permanent Yellow DHG, Permanent Yellow NCG-71, Permanent Yellow GG, Hansa Yellow RA, Hansa Brilliant Yellow 5GX-02, Hansa Yellow-X, NOVOPERM Yellow HR, NOVOPERM Yellow FGL, Hansa Brilliant Yellow 10GX, Permanent Yellow G3R-01, HOSTAPERM Yellow H4G, HOSTAPERM Yellow H3G, HOSTAPERM Orange GR, HOSTAPERM Scarlet GO, HOSTAPERM Pink E, Permanent Rubine F6B, and the HOSTAFINE series. The following pigments are available from Mobay Corp.: QUINDO Magenta, INDOFAST Brilliant Scarlet, QUINDO Red R6700, QUINDO Red R6713, and INDOFAST Violet. The following pigments are available from Sun Chemical Corp.: L74-1357 Yellow, L75-1331 Yellow, and L75-2577 Yellow. Other examples of pigments can include Normandy Magenta RD-2400, Permanent Violet VT2645, Argyle Green XP-111-S, Brilliant Green Toner GR 0991, Sudan Blue OS, PV Fast Blue B2GO1, Sudan III, Sudan II, Sudan IV, Sudan Orange G, Sudan Orange 220, Ortho Orange OR 2673, Lithol Fast Yellow 0991 K, Paliotol Yellow 1840, Lumogen Yellow D0790, Suco-Gelb L1250, Suco-Yellow D1355, Fanal Pink D4830, Cinquasia Magenta, Lithol Scarlet D3700, Toluidine Red, Scarlet for Thermoplast NSD PS PA, E. D. Toluidine Red, Lithol Rubine Toner, Lithol Scarlet 4440, Bon Red C, Royal Brilliant Red RD-8192, Oracet Pink RF, and Lithol Fast Scarlet L4300. These pigments are available from commercial sources such as Hoechst Celanese Corporation, Paul Uhlich, BASF, American Hoechst, Ciba-Geigy, Aldrich, DuPont, Ugine Kuhlman of Canada, Dominion Color Company, Magruder, and Matheson. Examples of other suitable colored pigments are described in the Colour Index, 3rd edition (The Society of Dyers and Colourists, 1982).

Other pigments not specifically listed can also be suitable for attachment to the polymers based on the disclosure provided herein. The above-illustrated pigments can be used singly or in combination of two or more. Typically, the pigments of the present system and method can be from about 10 nm to about 10 μm and in one aspect can be from 10 nm to about 500 nm in diameter, although sizes outside this range can be used if the pigment can remain dispersed and provide adequate color properties. In one detailed aspect of the present system and method, the pigment can comprise from about 1% to about 20% by weight of the ink-jet ink composition, and often can comprise from about 2% to about 5% by weight of the ink-jet ink composition.

Frequently, the pigment and the dye can have substantially the same color. In this way, the polymeric colorant can have improved chroma resulting from the presence of dye, while also improving lightfastness, waterfastness, and permanence as a result of the pigment. In one alternative aspect of the present system and method, the pigment can be a different color than the dye. For example, the pigment can have a black color and the dye can have a cyan or magenta color such that the polymeric colorant has an effective color which is a neutral gray. Alternatively, both cyan and magenta dyes can be covalently attached to the same polymer or separate polymers which are then attached to the same pigment. Thus, as a general matter, more than one type of dye can be attached to the same polymer chains. Additionally, more than one type of polymer and or polymer-dye combinations can be attached to the pigment particles.

Inclusion of Dispersant

The polymeric colorants of the present exemplary system and method can further include a dispersant attached thereto. Suitable dispersants can be attached to the pigment, the polymer, and/or the dye. In one specific embodiment, the dispersant can be attached to the pigment. Attaching the polymer to the pigment in accordance with the present exemplary system and method in many cases provides additional room for attachment of a dispersant directly to the pigment. In other embodiments, it can be desirable to attach dispersant to the polymer. In order to attach dispersant to the polymer, reactive groups similar to those used for attachment of the dye can be useful. Further, the dispersant can be attached simultaneously with the dye, or in a separate step. Generally, the order of attachment of the dye, dispersant, and the pigment can be adjusted to suit a particular manufacturing design. Often, the order of attachment is not critical; however, most often the pigment can be attached in a final processing step to a polymer-dye colorant having a dispersant attached thereto. Most often, the reactive group can be a carboxylic acid, however, reactive groups such as alcohol, amine, anhydride, sulfonic acid, thiol, halotriazine, maleimide and vinyl sulfone, or the like can also be used.

A wide variety of dispersants are known to those skilled in the art which can also be useful for attachment to the polymeric dyes of the present system and method. Non-limiting examples broad classes of suitable dispersants include polyalkyl glycols, polyalkyl imines, aryl dicarboxylic acids such as phthalic acids, isophthalic acids, terephthalic acids, carbohydrates, acrylates, methacrylates, trehalose, isomers thereof, and combinations thereof. As a general matter, glycol dispersants tend to be stable at neutral and higher pH, while imine dispersants tend to be stable at lower pH, e.g., about 4-6. In one specific embodiment, the dispersant can be polyethylene glycol. Dispersants can help to improve dispersion stability, but also can improve bleed control. Non-limiting examples of several specific suitable dispersants include polypropylene glycol, polyethylene imine, polyethylene glycol, trehalose, and combinations thereof. In some embodiments, the polymer having a dye attached thereto can also be a dispersant, such that the pigment is polymer-dispersed.

In an additional optional embodiment of the present system and method, the polymeric colorant can include various stabilizing additives. Such stabilizing additives can be any functional group which provides improved lightfastness, ozone fastness, steric stabilization, electrostatic stabilization, or the like. Specific non-limiting examples of suitable stabilizing additives include PEG (steric stabilization and improving solubility of certain dyes), carbohydrates (steric stabilization), polyethylene imine (electrosteric stabilization generally at acidic pH), acrylates (electrosteric stabilization generally at high pH), or the like. An additional benefit of the present system and method is to provide improved protection of the dye from light fade and/or degradation due to exposure to air. This can be at least partially due to a majority of the dye being embedded in the polymer to which it is attached and embedded by neighboring polymer chains.

As a general matter, polymeric colorants of the present system and method can have the structure as described above. However, in one specific embodiment, the polymeric colorant can have the general structure shown in Formula 4, which is based on maleic anhydride copolymers.

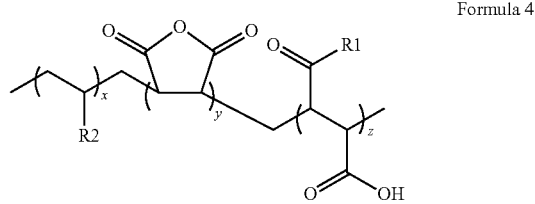

Formula 4 where x, y, and z are non-zero positive integers such that the polymer has a molecular weight less than about 20,000; R1 is the dye, the dispersant, or a linking group attached to the pigment with the proviso that z is at least three and at least one of each of the dye, the dispersant, and the linking group is present; and R2 is a hydrophobic group. It will be understood that the above structure does not necessarily indicate a block copolymer. Rather, for convenience the polymeric units are segregated and actual embodiments can be random copolymers, block copolymers, or any other arrangement of the monomeric units shown. R2 can be provided using any number of hydrophobic monomers such as styrene, 4-alkylstyrene, alkyl acrylates, methacrylates, methyl vinyl ether, alkyl vinyl ether, vinyl acetate, vinyl pyrrolidone, or the like. Further, when using maleic anhydride copolymers as shown in Formula 4, the monomeric units of group z are generally provided by reaction of the R1 group, i.e. dye, additive, or dispersant, with the anhydride portion of the maleic anhydride. Thus, the original number of maleic anhydride units is reduced by z, leaving y units of maleic anhydride during manufacture of the polymeric colorants of the present system and method.

In yet another more detailed aspect, the polymeric colorant can have the general structure:

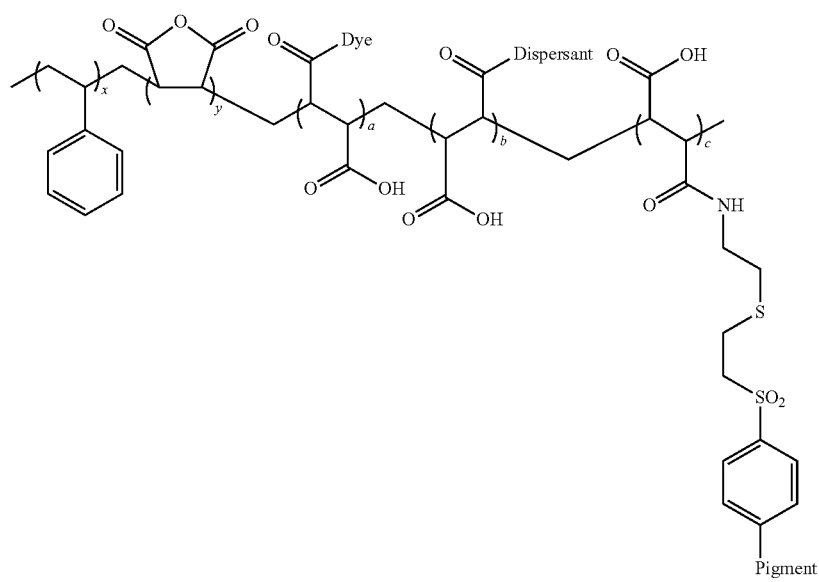

Formula 5 where a, b, and c are non-zero positive integers such that the polymer has a molecular weight less than about 20,000.

Ink-Jet Ink Compositions

The polymeric colorants of the present system and method can be used in a wide variety of applications such as, but not limited to, ink compositions, molded articles, or the like. In one aspect, the polymeric colorants of the present system and method can be included as part of an ink-jet ink composition. As such, the polymeric colorant, as described herein, can be dispersed in an appropriate liquid vehicle.

In yet another alternative embodiment, an ink-jet ink composition can include a liquid vehicle, a polymer attached dye, and a pigment. In this embodiment, the polymer attached dye can include a dye covalently attached to a polymer, with the dye having a first color. The pigment can have a second color which is substantially different in hue from the first color.

In such cases, the pigment is not necessarily attached to the dye and can be dispersed in accordance with known principles. Thus, the pigment can be polymer-dispersed, self-dispersed, or covalently attached to the polymer attached dye to form a polymeric colorant. In a further detailed aspect of this embodiment, the polymer can have at least two different dyes covalently attached to the polymer. In one aspect, the dye color can be cyan, magenta, or yellow and the pigment color can be black.

Ink-jettable ink compositions of the present system and method are typically prepared in an aqueous formulation or ink vehicle which can include water, cosolvents, surfactants, buffering agents, biocides, sequestering agents, viscosity modifiers, humectants, binders, plasticizers, fixers, and/or other known additives. Further, the present system and method can be used in conjunction with reactive ink sets for enhanced bleed control. Typically, the ink-jet ink compositions of the present system and method can have a viscosity of between about 0.8 to about 8 cps. In one aspect of the present system and method, the ink vehicle can comprise from about 70% to about 98% by weight of the ink-jet ink composition.

As described, cosolvents can be included in the ink-jet compositions of the present system and method. Suitable cosolvents for use in the present system and method include water soluble organic cosolvents, but are not limited to, aliphatic alcohols, aromatic alcohols, diols, glycol ethers, poly (glycol) ethers, lactams, formamides, acetamides, long chain alcohols, ethylene glycol, propylene glycol, diethylene glycols, triethylene glycols, glycerine, dipropylene glycols, glycol butyl ethers, polyethylene glycols, polypropylene glycols, amides, ethers, carboxylic acids, esters, organosulfides, organosulfoxides, sulfones, alcohol derivatives, carbitol, butyl carbitol, cellosolve, ether derivatives, amino alcohols, and ketones. For example, cosolvents can include primary aliphatic alcohols of 30 carbons or less, primary aromatic alcohols of 30 carbons or less, secondary aliphatic alcohols of 30 carbons or less, secondary aromatic alcohols of 30 carbons or less, 1,2-diols of 30 carbons or less, 1,3-diols of 30 carbons or less, 1,5-diols of 30 carbons or less, ethylene glycol alkyl ethers, propylene glycol alkyl ethers, poly(ethylene glycol) alkyl ethers, higher homologs of poly(ethylene glycol) alkyl ethers, poly(propylene glycol) alkyl ethers, higher homologs of poly(propylene glycol) alkyl ethers, lactams, substituted formamides, unsubstituted formamides, substituted acetamides, and unsubstituted acetamides. Specific examples of cosolvents that are preferably employed in the practice of this system and method include, but are not limited to, 1,5-pentanediol, 2-pyrrolidone, 2-ethyl-2-hydroxymethyl-1,3-propanediol, diethylene glycol, 3-methoxybutanol, and 1,3-dimethyl-2-imidazolidinone. Cosolvents can be added to reduce the rate of evaporation of water in the ink to minimize clogging or other properties of the ink such as viscosity, pH, surface tension, optical density, and print quality. The cosolvent concentration can range from about 0% to about 50 wt %.

Various buffering agents can also be optionally used in the ink-jet ink compositions of the present system and method. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; and other basic or acidic components which do not interfere with the colorant characteristics of the present system and method. If used, buffering agents typically comprise less than about 10% by weight of the ink-jet ink composition.

In another aspect of the present system and method, various biocides can be used to inhibit growth of undesirable microorganisms. Several non-limiting examples of suitable biocides include benzoate salts, sorbate salts, commercial products such as NUOSEPT (Nudex, Inc., a division of Huls America), UCARCIDE (Union Carbide), VANCIDE (RT Vanderbilt Co.), and PROXEL (ICI Americas) and other known biocides. Typically, such biocides comprise less than about 5% by weight of the ink-jet ink composition and often from about 0.1% to about 0.25% by weight.

In an additional aspect of the present system and method, binders can be included which act to secure the polymeric colorants on the substrate. Binders suitable for use in the present system and method typically have a molecular weight of from about 100 to about 50,000 g/mol. Non-limiting examples include polyester, polyester-melanine, styrene-acrylic acid copolymers, styrene-acrylic acid-alkyl acrylate copolymers, styrene-maleic acid copolymers, styrene-maleic acid-alkyl acrylate copolymers, styrene-methacrylic acid copolymers, styrene-methacrylic acid-alkyl acrylate copolymers, styrene-maleic half ester copolymers, vinyl naphthalene-acrylic acid copolymers, vinyl naphthalene-maleic acid copolymers, and salts thereof.

Standard water-soluble surfactants can also be optionally used such as alkyl polyethylene oxides, alkyl phenyl polyethylene oxides, polyethylene oxide (PEO) block copolymers, acetylenic PEO, PEO esters, PEO amines, PEO amides, and dimethicone copolyols. Some of these materials are available commercially under the tradenames TERGITOL, SURFYNOL, ZONYL, TRITON, MERPOL, and the like. If used, surfactants can be from 0.01% to about 10% by weight of the ink-jet ink composition.

Once the ink-jet ink compositions are prepared, they can be placed into one or more ink-jet pens as is well known in the art. In one detailed aspect of the present exemplary system and method, a system for printing images on a substrate in accordance with the present system and method can include at least one firing chamber containing ink-jet ink compositions, respectively, to form an inkjet pen. Typical ink-jet pens can have an orifice plate having a plurality of orifices through which the ink-jet ink composition can be delivered to a substrate using thermal, piezoelectric, or other known ink-jet technologies.

EXAMPLES

The following examples illustrate a number of embodiments of the present systems and methods that are presently known. However, it is to be understood that the following are only exemplary or illustrative of the application of the principles of the present systems and methods. Numerous modifications and alternative compositions, methods, and systems may be devised by those skilled in the art without departing from the spirit and scope of the present systems and methods. The appended claims are intended to cover such modifications and arrangements. Thus, while the present systems and methods have been described above with particularity, the following examples provide further detail in connection with what are presently deemed to be the acceptable embodiments.

Example 1

C.I. Acid Red 440 was attached to styrene maleic anhydride polymer SMA 1000 as follows. 110 g (544 mmole anhydride) of SMA 1000 was added to 1 liter of dry dimethylformamide (DMF) in a flask under a nitrogen atmosphere to form a suspension. The suspension was then heated to approximately 50° C. with stirring to give a clear solution. To this solution under nitrogen was added 80.4 g (220 mmole) of AR 440, 22.3 g (220 mmole) of triethylamine and 2.7 g (22 mmole) of dimethylaminopyridine. The mixture was then stirred for at least 4 hours at this temperature. After stirring the above mixture, 36.4 g (320 mmole) of 2-aminoethanethiol hydrochloride was added, followed by 64.8 g (640 mmole) of triethylamine. The mixture was then stirred overnight while it cooled down to room temperature under a nitrogen atmosphere. The mixture was then added to an excess of ice cold 1 N hydrochloric acid. This resulted in precipitation of a bluish red polymer dye conjugate. The precipitate was filtered and washed several times with 1 N HCl followed by deionized water. The mixture is then dried in a vacuum desiccator at room temperature.

Conjugation of the above dye-polymer conjugate to pigment red 122 was then accomplished as follows. To a stirred solution of 100 mL of 1 N NaOH under nitrogen was added 20 g of the dye-polymer conjugate described above. The mixture was then heated to 50° C. to ensure complete dissolution. To the clear magenta solution was added 400 g of a 10% aqueous dispersion of pigment red 122 having been modified with 2-(4-aminophenyl) sulfonylethane sulfonate. The pH was raised to about 12-13 by the addition of 25 ml more 1 N NaOH and the mixture was stirred overnight at room temperature under nitrogen atmosphere. The resultant dispersion was then capped with sodium acrylate and purified by diafiltration.

Example 2

110 g (544 mmole anhydride) of SMA 1000 was added to 1 liter of dry dimethylformamide (DMF) in a reaction flask under a nitrogen atmosphere. The suspension was then heated to approximately 50° C. while stirring to give a clear solution. To this solution was added approximately 45.4 g (400 mmole) of 2-aminoethanethiol hydrochloride and approximately 100 g (100 mmole) of Jeffamine® XTJ506 (a polyoxyalkyleneamine dispersant available from Huntsman Corporation) and the mixture was stirred under nitrogen atmosphere for about 30 minutes. Then approximately 101.2 g (1 mole) of triethylamine was added in a dropwise fashion. The mixture was then allowed to cool to room temperature and stirred overnight under a nitrogen atmosphere. The mixture was then added to an excess of ice cold 1 N hydrochloric acid, resulting in a white polymer precipitate. The precipitate was then filtered and washed several times with 1 N HCl followed by deionized water. Finally, the mixture was then dried in a vacuum desiccator at room temperature.

Continuing, to a stirred solution of 700 mL of 1 N NaOH under nitrogen was added approximately 140 g of the modified SMA polymer described above. The mixture was then heated to approximately 50° C. to ensure complete dissolution. To the solution was added approximately 502 g (80 mmole) of a 10% aqueous solution of reactive blue 19 dye over 10 minutes. The pH was then raised to 12-13 by addition of 150 ml of 1 N NaOH and the mixture was stirred overnight at room temperature under nitrogen atmosphere. The mixture was then added to an excess of ice cold 1 N hydrochloric acid, resulting in a blue precipitate of dye-polymer conjugate. The precipitate was filtered and washed several times with 1 N HCl followed by deionized water. The mixture was then dried in a vacuum desiccator at room temperature.

Conjugation of the above dye-polymer conjugate to carbon black pigment was then accomplished as follows. To a stirred solution of 100 mL of 1 N NaOH under nitrogen was added approximately 20 g of the dye-polymer conjugate described above. The mixture was heated to approximately 50° C. to ensure complete dissolution. To the clear blue solution was then added 400 g of a 10% aqueous dispersion of carbon black having modified with 2-(4-aminophenyl) sulfonylethane sulfonate. The pH was raised to 12-13 by addition of 25 ml of 1 N NaOH and the mixture was stirred overnight at room temperature under nitrogen atmosphere. The resultant dispersion was then capped with sodium acrylate and purified by diafiltration.

In conclusion, the present exemplary system and method provide for the generation of a polymeric colorant including a pigment having a polymer covalently attached thereto. Further, a dye can be covalently attached to the polymer. A dispersant can be covalently attached to at least one of the pigment, the polymer, and/or the dye to provide dispersion stability to the polymeric colorant in a liquid vehicle. By including both a pigment and a dye component, the present polymeric colorant can benefit from the properties of each.

The preceding description has been presented only to illustrate and describe exemplary embodiments of the present system and method. It is not intended to be exhaustive or to limit the system and method to any precise form disclosed. Many modifications and variations are possible in light of the above teaching. It is intended that the scope of the system and method be defined by the following claims.

What is claimed is:

1. A polymeric colorant, comprising:
   a pigment;
   a polymer covalently coupled to said pigment;
   a dye covalently attached to said polymer; and
   a dispersant covalently attached directly to said pigment,
   wherein said colorant further comprises a linking group comprising either ethylenediamine or aminoethanethiol covalently coupling said dye to said polymer.

2. The polymeric colorant of claim 1, wherein said linking group comprises ethylenediamine covalently coupling said dye to said polymer.

3. The polymeric colorant of claim 1, wherein:
   said polymer comprises styrene-maleic anhydride copolymer;
   said linking group includes aminoethanethiol; and
   said dye is a dye derivative.

4. The polymeric colorant of claim 3, wherein said dye derivative comprises xanthylium, 9-[4-(Chlorosulfonyl)-2-sulfophenyl]-3,6-bis(diethylamino)-, inner salt (9Cl).

5. The polymeric colorant of claim 1, wherein said linking group is a polymerizable monomer and said dye is incorporated into said polymer via copolymerization of a dye-monomer conjugate with suitable co-monomers, wherein said dye-monomer conjugate comprises said polymerizable monomer and said dye.

6. The polymeric colorant of claim 5, wherein said dye-monomer is made by modification of a dye derivative.

7. The polymeric colorant of claim 6, wherein said dye derivative is derivatized with said monomer.

8. The polymeric colorant of claim 6, wherein said dye derivative comprises xanthylium, 9-[4-(Chlorosulfonyl)-2-sulfophenyl]-3,6-bis(diethylamino)-, inner salt (9Cl).

9. The polymeric colorant of claim 6, wherein said linking group coupling said dye derivative to said polymer comprises an ethylenediamine adduct.

10. The polymeric colorant of claim 6, wherein said polymer is copolymerized with a vinyl containing monomer.

11. The polymeric colorant of claim 10, wherein said vinyl containing monomer comprises one of a styrene, an acrylic acid, a methacrylic acid, a benzyl acrylate, or a butyl acrylate.

12. The polymeric colorant of claim 10, wherein said vinyl containing monomer comprises one of the following structures:

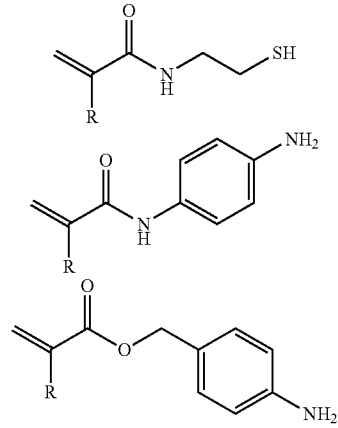

wherein R is either hydrogen or a methyl group.

13. The polymeric colorant of claim 5, wherein said polymer comprises a polyurethane.

14. The polymeric colorant of claim 1, wherein said dye is selected from the group consisting of C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, and C.I. Reactive Black 39.

15. The polymeric colorant of claim 1, further comprising a second dye covalently attached to said polymer.

16. The colorant of claim 15, wherein said dye comprises a first dye, and said colorant further comprises a second dye of a different color than the first dye.

17. The colorant of claim 1, wherein said pigment comprises a different color than said dye.

18. The colorant of claim 17, wherein said pigment has a black color and the dye has a cyan or magenta color such that said polymeric colorant has an effective neutral gray color.

19. The colorant of claim 1, wherein the pigment comprises a member selected from the group consisting of black pigments, cyan pigments, magenta pigments, and yellow pigments.

20. The colorant of claim 19, wherein said pigment comprises carbon black.

21. The colorant of claim 1, wherein said dispersant is a member selected from the group consisting of polyalkyl glycols, polyalkyl imines, trehalose, acrylates, and methacrylates.

22. The colorant of claim 1, further comprising a stabilizing additive.

23. An ink-jet ink composition, comprising a liquid vehicle having the polymeric colorant of claim 1 dispersed therein.

24. The composition of claim 23, wherein said polymer comprises a styrene acrylic acid copolymer.

25. The composition of claim 23, wherein said reactant comprises ethylenediamine.

26. An ink-jet composition, comprising:
   a liquid vehicle and the polymeric colorant of claim 1.

27. The composition of claim 26, wherein said dye comprises xanthylium, 9-[4-(Chlorosulfonyl)-2-sulfophenyl]-3,6-bis(diethylamino)-, inner salt (9Cl).

28. The composition of claim 26, wherein said polymer is copolymerized with a vinyl containing monomer.

29. The composition of claim 28, wherein said vinyl containing monomer comprises one of a styrene, an acrylic acid, a methacrylic acid, a benzyl acrylate, or a butyl acrylate.

30. The composition of claim 28, wherein said vinyl containing monomer comprises one of the following structures:

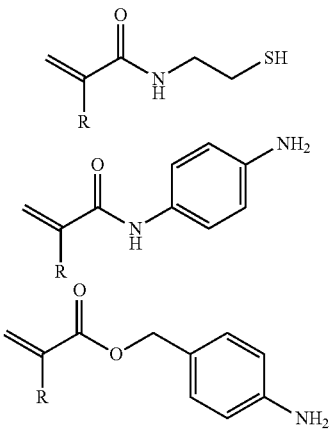

wherein R is either hydrogen or a methyl group.

31. A method of forming a polymeric colorant comprising:
attaching a dye to a polymer to form a polymer-dye colorant, wherein said attaching a dye to said polymer comprises derivitizing said dye to form a dye derivative and coupling the dye derivative to a polymerizable adduct comprising ethylenediamine;
covalently attaching the polymer to a pigment; and
covalently attaching a dispersant directly to the pigment;
wherein said attaching a dye to a polymer includes covalently attaching a linking group to said dye and to said polymer.

32. The method of claim 31, wherein said polymer comprises a styrene acrylic acid copolymer.

33. The method of claim 31, wherein said dye is selected from the group consisting of C.I. Acid Red 440, C.I. Reactive Red 3, C.I. Reactive Red 13, C.I. Reactive Red 23, C.I. Reactive Red 24, C.I. Reactive Red 33, C.I. Reactive Red 43, C.I. Reactive Red 45, C.I. Reactive Red 120, C.I. Reactive Red 180, C.I. Reactive Red 194, C.I. Reactive Red 220, C.I. Reactive Violet 4, C.I. Reactive Blue 19, C.I. Reactive Blue 5, C.I. Reactive Blue 49, C.I. Reactive Yellow 2, C.I. Reactive Yellow 3, and C.I. Reactive Black 39.

34. The method of claim 31, wherein said pigment is a member selected from the group consisting of black pigments, cyan pigments, magenta pigments, and yellow pigments.

* * * * *

UNITED STATES PATENT AND TRADEMARK OFFICE
CERTIFICATE OF CORRECTION

PATENT NO. : 8,153,706 B2  
APPLICATION NO. : 11/239738  
DATED : April 10, 2012  
INVENTOR(S) : Sundar Vasudevan Page 1 of 1

It is certified that error appears in the above-identified patent and that said Letters Patent is hereby corrected as shown below:

In column 22, line 4, in Claim 31, delete "derivitizing" and insert -- derivatizing --, therefor.

Signed and Sealed this
Nineteenth Day of February, 2013

Teresa Stanek Rea
*Acting Director of the United States Patent and Trademark Office*